United States Patent Office 3,282,996
Patented Nov. 1, 1966

3,282,996
PROCESS FOR SEPARATING AND PURIFYING α-AMINO-β-HYDROXY-LOWER ALKANOIC ACIDS
Hirotoshi Samejima and Yuji Nagano, Tokyo, Japan, assignors to Kyowa Hakko Kogyo Co., Ltd., Tokyo, Japan, a corporation of Japan
No Drawing. Filed Mar. 3, 1965, Ser. No. 436,937
Claims priority, application Japan, June 16, 1962, 37/24,456
5 Claims. (Cl. 260—534)

This application is a continuation-in-part of our application Serial No. 284,328, now abandoned, filed May 31, 1963, entitled Process for Separating and Purifying Oxyamino Acids.

The present invention relates to a process for separating and purifying α-amino-β-hydroxy-lower alkanoic acids, such as L-threonine, from a mixture of amino acids, from a natural substance or a fermentation broth containing them.

An object of the invention is to produce highly pure α-amino-β-hydroxy-lower alkanoic acids on a commercial scale at a low cost and by a simple procedure.

Among α-amino-β-hydroxy-lower alkanoic acids, threonine (α-amino-hydroxybutyric acid) and serine (α-amino-β-hydroxypropionic acid) are best known. Threonine, in particular, is known as an essential amino acid and is commercially valuable in pharmaceuticals and as a nutrient.

The present invention provides a novel process for separating and purifying α-amino-β-hydroxy-lower alkanoic acids, by converting a mixture of amino acids, which contains α-amino-β-hydroxy-lower alkanoic acids, in aqueous solution to their copper complex salts by addition of basic copper carbonate, adsorbing merely copper complex salt of α-amino-β-hydroxy-lower alkanoic acid onto a polystyrene quaternary ammonium type strongly basic ion exchange resin by utilization of the difference of adsorption selectively between each of the complex salts, releasing the adsorbed complex salt by a mineral acid, such as hydrochloric acid, eliminating copper from the complex salt solution by treatment with hydrogen sulfide or a chelating resin, such as polystyrene iminodiacetate-type resin, e.g. Dowex A–1, and recovering α-amino-β-hydroxy-lower alkanoic acid in crystalline form from the decoppered α-amino-β-hydroxy-lower alkanoic acid solution.

The present invention is described specifically in an example wherein a fermentation broth is used as the source material.

The present inventors have proposed a method for producing L-threonine by fermentation.

In the fermentation broth obtained by this process, L-homoserine sometimes remains along with byproducts, such as L-valine and L-alanine. For commercial production of pure L-threonine from the above-noted fermentation broth, the separation of L-threonine from the by-produced neutral amino acids is necessary.

Heretofore, a method using oxazolidone derivative [D. F. Elliot; Biochemical Journal 45, 429 (1949)], was known for the separation and purification of α-amino-β-hydroxy-lower alkanoic acid from an amino acid mixture. This method has, however, little value from a commercial point of view because of the particular reagents employed and the troublesome procedures involved.

Copper complex salts of hydroxyamino acids are specifically strongly adsorbed onto polystyrene quaternary ammonium type strongly basic ion exchange resin (OH type) within the pH range of 7 to 10, and there is a clear difference between the adsorbing power of the copper complex salt of L-threonine, one of the α-amino-β-hydroxy-lower alkanoic acids, and that of the copper complex salt of L-homoserine, one of α-amino-γ-hydroxy acids.

The difference between the adsorbing powers is seen from the following equations:

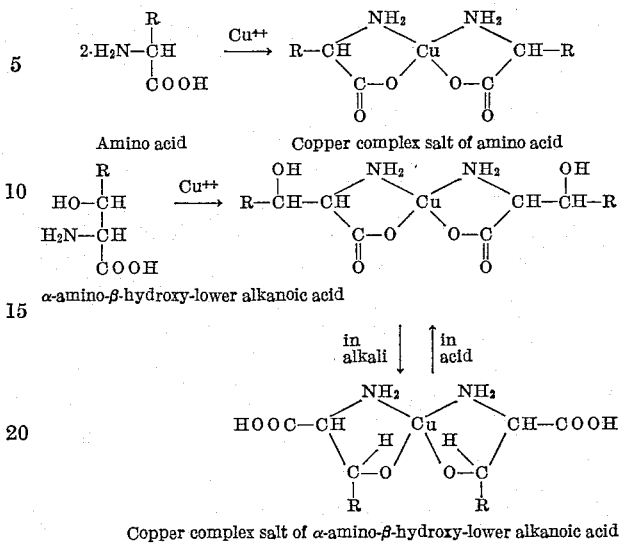

Copper complex salt of α-amino-β-hydroxy-lower alkanoic acid
wherein R is H or alkyl group.

As shown in the equations described above, the copper ion is generally bound to an amino acid between the amino radical and the carboxyl radical to form the copper complex salt of the amino acid, which is not adsorbed by polystyrene quaternary ammonium type strongly basic ion exchange resin, because of lack of electron charge. In a hydroxyamino acid, however, the copper ion is bound to the acid between the amino radical and the hydroxyl radical. Thus, the complex salt has the carboxyl radicals in a free state, which permits the salt to be adsorbed onto polystyrene quanternary ammonium type strongly basic ion exchange resin as acidic substance. Accordingly, copper complex salt of hydroxyamino acid can be separated from copper complex salts of other amino acids by coverting the amino acid mixture to their copper complex salts and passing the salt solution through a column of a strongly basic ion exchange resin to adsorb the salt of hydroxyamino acid selectively. Among the hydroxyamino acids, the copper complex salt of α-amino-β-hydroxy-lower alkanoic acid is adsorbed onto strongly basic ion exchange resin more strongly than that of α-amino-γ-hydroxy acid, so that they can be separated from each other.

In separating copper complex salts of amino acids from each other by use of strongly basic ion exchange resin, it is desirable to effect the removal of inorganic salts preliminarily, since the presence of considerable salt is deleterious to the separation.

Thus α-amino-β-hydroxy-lower alkanoic acid alone is finally separated and recovered by utilization of the difference in adsorbing powers between various copper complex salts of amino acids onto ion exchange resin, namely: by selective adsorption of merely copper complex salt of α-amino-β-hydroxy-lower alkanoic acid in neutral amino acid mixture onto strongly basic ion exchange resin. In the case of the fermentation broth mentioned above, L-threonine alone is separated and recovered.

When the copper complex salt of α-amino-β-hydroxy-lower alkanoic acid is adsorbed onto an ion exchange resin, the adsorbed band in the column is a deep blue color, the movement of which can, therefore, be observed by the naked eye. Such exceedingly efficient adsorption and releasing procedure of ion exchange resin is one of the remarkable features of the present invention.

The copper complex salt of α-amino-β-hydroxy-lower alkanoic acid adsorbed onto resin can be easily recovered by elution with a dilute mineral acid, such as dilute hydrochloric acid and sulfuric acid. The state of elution can be easily judged by movement and disappearance of the colored band.

For the removal of copper from the eluted copper complex salt of α-amino-β-hydroxy-lower alkanoic acid, hydrogen sulfide gas is passed through the eluate under acidic conditions, or the eluate is treated with a polystyrene iminodiacetate-type chelating resin (for example, Dowex A–1, trade name of Dow Chemical Co., Ltd.) under neutral conditions, thereby completely de-coppering α-amino-β-hydroxy-lower alkanoic acid without any loss to yield an aqueous solution of the free acid, for example, free L-threonine, which gives substantially pure α-amino-β-hydroxy-lower alkanoic acid crystals by ordinary recrystallization.

Unlike the previously known separation method, the present invention makes possible the separation and recovery of high purity α-amino-β-hydroxy-lower alkanoic acid simply and with superior yield, without using any specific reagent. The process of the invention is extremely advantageous commercially since large quantities of material can be treated.

The present invention is applicable to all mixtures containing the noted types of amino acids, of which the indicated fermentation broth is only one. Other examples include natural substances or their decomposed derivatives, in general, which contain α-amino-β-hydroxy-lower alkanoic acid. Of course, the process can be applied to α-amino-β-hydroxy-lower alkanoic acid produced synthetically if separation from other amino acids is needed.

The process of the invention is more concretely exemplified in the following examples.

*Example 1*

To four hundred milliliters of an aqueous solution containing 1.6 g. of L-threonine and 1.6 g. of L-homoserine are added 4 g. of basic copper carbonate. The resulting mixture is boiled for 15 minutes. After cooling, said mixture is filtered to separate excess copper carbonate from a deep blue solution of copper complex salt of the amino acids. Three glass tubes (0.8 cm. diameter), each filled with 10 ml. of polystyrene quaternary ammonium type strongly basic ion exchange resin (Diaion SA 21A; a trade name of Mitsubishi Chemical Ind. Co.) which has been regenerated to the OH type, are connected in series. The above-mentioned 400 ml. of the aqueous solution are passed through the filled tubes, whereby L-homoserine-copper complex salt is flown out, while all of L-threonine-copper complex salt alone is adsorbed onto the resin column. The resin is eluted with 0.1 N hydrochloric acid, whereby almost all of the L-threonine-copper complex salt is recovered in the eluate having pH of 6 to 7. The eluate is then passed through a glass tube (1 cm. diameter) filled with 20 ml. of polystyrene iminodiacetate-type chelating resin (Dowex A–1; trade name of Dow Chemical Co.) adjusted to the Na type, at flow velocity of S.V.=1. The chelating resin is washed with 600 ml. of water. One hundred and eighty milliliters of the de-coppered L-threonine fraction is concentrated in vacuo to 10 ml., which is then mixed with the same amount of ethyl alcohol. The mixture is allowed to stand overnight at 5° C., thereby crystals of L-threonine are isolated, which weigh, after filtration and drying, 850 mg. Further concentration in vacuo of the mother liquor yields 230 mg. of the crystals. The product is certified to be L-threonine alone by paper chromatography.

*Example 2*

Three liters of an L-threonine-fermentation broth, obtained by the process described in copending U.S. Ser. No. 112,543, now Patent No. 3,099,604, containing 15 g. of L-threonine, 10 g. of L-homoserine, 6 g. of L-alanine, 6 g. of L-valine, and a small amount of other amino acids, is divided in equal three portions, each of which is passed through a resin column filled with 500 ml. of sulfonated polystyrene strongly acidic ion exchange resin (Diaion SK #1; trade name of Mitsubishi Chemical Industries Co.) regenerated to the H type to adsorb all amino acids. Each resin column is washed with water and then eluted with 1 N aqueous ammonia to collect a fraction (pH 6–9) containing a major portion of the amino acids. This eluate is contaminated with substantially no protein, non-electrolyte or inorganic salt present in the fermentation broth. To eighty milliliters of the eluate solution is added 20 g. of basic copper carbonate. The resulting admixture is boiled for 15 minutes, whereby amino acids are converted to their copper complex salts. After cooling said admixture, excess basic copper carbonate is filtered off to yield a deep blue, clear aqueous solution of copper complex salts of amino acids. The salt solution is passed through four ion exchange resin columns connected in series, each of which is filled with 100 ml. of polystyrene quaternary ammonium type strongly basic ion exchange resin (Amberlite IRA–410; trade name of Rohm & Haas Co.) regenerated to the OH type. The copper complex salts of valine, alanine and other neutral amino acids flow through as they are. L-homoserine-copper complex salt is at first adsorbed onto the resin column, but is gradually replaced by L-threonine-copper complex salt and flowed off. The resin column adsorbs merely L-threonine at the final stage and is eluted with 0.1 N hydrochloric acid to obtain 1.2 liters of a threonine-copper complex salt solution containing 13 g. of L-threonine. The solution is acidified with 80 ml. of 2 N hydrochloric acid, and hydrogen sulfide gas is passed through the acidified solution to precipitate the copper as copper sulfide, which is then filtered off, leaving aqueous L-threonine solution. The solution is deacidified by treatment with aminated polystyrene weakly basic ion exchange resin (Amberlite IR–45, trade name of Rohm & Haas Co.) regenerated to the OH type, concentrated in vacuo to 100 ml. volume, mixed with the equal volume of ethyl alcohol, and allowed to stand at 5° C. overnight. Eight grams (dry) of L-threonine crystals are obtained. Further concentration of the mother liquor, followed by similar procedure, yields 2.5 g. of the crystals. Analysis of the product by paper chromatography shows that it comprises no amino acid other than L-threonine.

*Example 3*

Using 400 ml. of an aqueous solution containing 1.4 g. of L-serine and 1.4 g. of DL-alanine, instead of the material in Example 1, the procedure of Example 1 is repeated. L-serine crystals are recovered in a yield of 1.02 g. Analysis by paper chromatography confirms that the product is composed solely of L-serine.

*Example 4*

Using 500 ml. of an aqueous solution containing 2.0 g. of L-serine and 1.8 g. of L-valine, instead of the L-threonine and L-homoserine used in Example 1, the procedure according to Example 1 is repeated. L-serine crystals are recovered in a yield of 1.54 g. Analysis by paper chromatography confirms that the product is composed solely of L-serine.

*Example 5*

Using 500 ml. of an aqueous solution containing 2.5 g. of L-threonine and 2.0 g. of L-isoleucine, instead of the L-threonine and L-homoserine used in Example 1, the procedure according to Example 1 is repeated. L-threonine crystals are recovered in a yield of 2.04 g. Analysis by paper chromatography confirms that the product is composed solely of L-threonine.

*Example 6*

Using 500 ml. of an aqueous solution containing 1.8 g. of L-serine and 2.0 g. of L-phenylalanine, instead of the L-threonine and L-homoserine used in Example 1, the procedure according to Example 1 is repeated. L-serine crystals are recovered in a yield of 1.36 g. Analysis by paper chromatography confirms that the product is composed solely of L-serine.

The invention and its advantages will be understood from the foregoing description, and it is apparent that various changes may be made in the process of separating α-amino-β-hydroxy-lower alkanoic acids from other amino acids without departing from the spirit and scope of the invention or sacrificing its material advantages. Said process is applicable to all α-amino-β-hydroxyamino acids, the specific examples being merely illustrative of preferred embodiments of the invention.

What we claim is:

1. A process for separating and purifying α-amino-β-hydroxy-lower alkanoic acids which comprises converting a mixture containing α-amino-β-hydroxy-lower alkanoic acid and other α-amino carboxylic acids to copper complex salt, contacting an aqueous solution of the copper complex salt with strongly basic anion exchange resin of the quaternary ammonium type to adsorb the α-amino-β-hydroxy-lower alkanoic acid-copper complex salt onto the resin, eluting the resin with aqueous mineral acid solution, removing the copper from the eluate with a decoppering agent, and recovering α-amino-β-hydroxy-lower alkanoic acid from the decoppered eluate in crystalline form.

2. A process according to claim 1, wherein said decoppering agent is hydrogen sulfide.

3. A process according to claim 1, wherein said decoppering agent is a chelating resin.

4. A process according to claim 1, wherein the α-amino-β-hydroxy-lower alkanoic acid is L-threonine.

5. A process according to claim 1, wherein the α-amino-β-hydroxy-lower alkanoic acid is L-serine.

References Cited by the Examiner

UNITED STATES PATENTS

| | | | |
|---|---|---|---|
| 2,999,878 | 9/1961 | Okawa et al. | 260—534 |
| 3,059,026 | 10/1962 | Miyamae et al. | 260—534 |

OTHER REFERENCES

Dowex: Ion Exchane, The Dow Chemical Company, Midland, Michigan, 1958, relied upon pages 29 and 30.

LORRAINE A. WEINBERGER, *Primary Examiner.*

R. K. JACKSON, *Examiner.*

A. P. HALLUIN, *Assistant Examiner.*